Nov. 10, 1970 H. WIDMANN ET AL 3,539,390
PROCESS FOR MAKING A SEMICONDUCTOR DEVICE
Filed Aug. 21, 1967
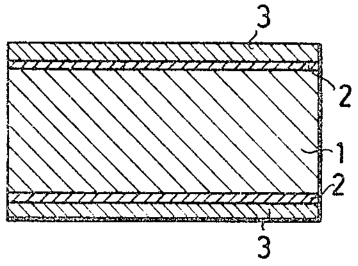
INVENTORS
Hermann WIDMANN
Georg KUBACH
Gerd PESCHEK United States Patent Office 3,539,390

Patented Nov. 10, 1970

3,539,390
PROCESS FOR MAKING A SEMICONDUCTOR DEVICE

Hermann Widmann, Ulm, Georg Kubach, Renningen, and Gerd Peschek, Stuttgart-Feuerbach, Germany, assignors to Robert Bosch GmbH, Stuttgart, Germany Filed Aug. 21, 1967, Ser. No. 662,169
Claims priority, application Germany, Aug. 26, 1966, B 88,630
Int. Cl. B44d *1/092*
U.S. Cl. 117—213 4 Claims

ABSTRACT OF THE DISCLOSURE

A semiconductor device is formed by activating the surface of the semiconductor with an activating solution that has been adjusted to a pH between 4 and 5. Preferably, the activating solution contains a buffer consisting of ammonium fluoride or urotropine and an addition of methanol.

An example is a semiconductor consisting of a single crystal silicon body that has been doped with boron or phosphorus and to which the activating solution is applied in the form of an aqueous hydrofluoric acid solution containing the above identified buffers and containing gold or palladium ions. An intercoat of nickel is then applied to the semiconductor and a nickel contact electrode is applied in the form of a nickel coating on top of the intercoat.

BACKGROUND OF THE INVENTION

When activating a semiconductor surface it has been found in prior art processes that considerably more activator metal was deposited on the n-doped places per unit of time than on the p-doped locations. Besides, it has happened in case of a somewhat extended activating operation that an oxide coating did form at the n-doped locations beneath the metal deposit which oxide coating impaired the subsequent contact formation. It is possible to deposit a nickel coating by chemical means on such activated surface. However, the nickel coating has a tendency to peel off during the subsequent tempering step because it is not firmly anchored in the semiconductor body.

SUMMARY OF THE INVENTION

The invention therefore has the object of forming a semiconductor body on which an even amount of activator metal is deposited per unit of time both at the n-doped and at the p-doped areas. A further object is a semiconductor to which a contact layer can be applied without impairment by an oxide layer which may have been formed at the n-doped areas.

A still further object is to permit the chemical deposition of a nickel layer as contact electrode which is firmly united with the semiconductor body.

The invention comprises a process for making a semiconductor device comprising activating the surface of a semiconductor body with an activating solution that has been adjusted to a pH between 4 and 5 prior to application of a contact metal to the semiconductor.

The novel features which are considered as characteristic for the invention are set forth in particular in the appended claims. The invention itself, however, both as to its construction and its mode of operation, together with additional objects and advantages thereof, will be best understood from the following description of specific embodiments with reference to the accompanying drawing.

BRIEF DESCRIPTION OF THE DRAWING

The single drawing illustrates, in a diagrammatic manner, a semiconductor formed in accordance with the teaching of the invention.

DESCRIPTION OF THE PREFERRED EMBODIMENTS

Preferably, the activating solution is adjusted to the desired pH between 4 and 5 by a buffer of ammonium fluoride or urotropine. A particularly beneficial effect is obtained if a certain amount of methanol is added to the buffered activating solution.

With reference to the drawing the single figure indicates a silicon disc that has been doped with boron and phosphorus and has a thickness of 200 micrometers. The silicon disc forms the semiconductor body for instance of a semiconductor rectifier. The disc is etched with a conventional etching solution, such as an aqueous solution of potassium hydroxide and sodium hydroxide. Prior to that it may optionally also be etched with hydrofluoric acid that has been saturated with potassium dichromate ($K_2Cr_2O_7$).

The disc 1 is thereafter dipped into an aqueous hydrofluoric acid solution buffered with ammonium fluoride ($NH_4F$) or urotropine ($N_4(CH_2)_6$). To the hydrofluoric acid solution ions of a catalytically active metal preferably gold or palladium ions are added. The solution is adjusted as to a pH between 4 and 7, preferably between 4 and 5.

The following examples illustrate different compositions of solutions without any intention of limiting the scope of the invention.

EXAMPLE I 30 ml. HF (38–40%)
120 ml. deionized $H_2O$
80 g. $NH_4F$
1 ml. Au standard solution
pH 4–5

EXAMPLE II 30 ml. HF (38–40%)
60 ml. deionized $H_2O$
60 ml. $CH_3OH$
80 g. $NH_4F$
1 ml. Pd standard solution
pH 4–5

EXAMPLE III 30 ml. HF (38–40%)
60 ml. deionized $H_2O$
60 ml. $CH_3OH$
80 g. $NH_4F$
1 ml. Au standard solution
pH 4–5

EXAMPLE IV 30 ml. HF (38–40%)
60 ml. deionized $H_2O$
60 ml. Au standard solution
urotropine pH 4.5–5

The gold or palladium standard solution contains in each case one gram of metal per 100 ml. of solution.

By virtue of the treatment with this solution a thin gold layer which is not shown in the drawing forms on the silicon disc 1 which activates the surface of the disc for the subsequent nickel deposition.

The nickel is then applied in the form of an interlayer 2 by means of a chemical plating process. The deposition of the nickel can for instance be effected by way of the Nibodur process involving reduction of nickel chloride ($NiCl_2$) with boron hydride ($BH_3$). Instead of the nickel chloride it is also possible to use a nickel sulfate $NiSO_4$ or nickel acetate or another nickel salt.

By this prior activation the nickel-plating reaction will be caused to start spontaneously. This permits completion of all silicon discs which have been dipped into the plating bath at the same time. In other words, they will all be provided with an intercoat of predetermined uniform thickness.

As the next step the silicon disc 1 which now has been supplied with the intercoat 2 is subjected to a thorough washing and drying and subsequently to a tempering in an inert gas atmosphere at a temperature above 400° C. The intercoat 2 is thereby partially embedded in the silicon disc 1. This results in a good adhesion of the intercoat 2 to the silicon disc.

Since however the tempered intercoat 2 could not be soldered there is subsequently supplied a second nickel layer by chemical plating which will serve as the contact electrode 3. The deposit of the contact electrode is likewise effected by reducing nickel chloride with boron hydride. In order to obtain a spontaneous start of the nickel reaction also in this case the intercoat 2 is subjected to a second activating treatment prior to applying the contact electrode layer 3. The activating treatment is effected with an aqueous hydrofluoric acid solution containing nickel chloride.

It is also possible to apply a layer of gold to the plated nickel coat 3 in order to improve the contact properties.

In conclusion it is noted that the process is not restricted to the described preferred embodiment. It can in particular be used also for forming contacts on silicon discs which are partly provided with an oxide mask.

What is claimed as new and desired to be secured by Letters Patent is set forth in the appended claims:

1. The process of making a semiconductor comprising the step of activating the semiconductor surface with an activating solution buffered with ammonium fluoride or urotropine to a pH between 4 and 7 and containing ions of a catalytically active metal, then applying a nickel intercoat by a plating operation, thereupon subjecting the semiconductor to tempering above 400 C. to effect partial embedding and alloying of the nickel layer in the semiconductor surface followed by applying a solderable metal layer on top of the intercoat to form a contact electrode.

2. The process of claim 1 wherein the ions present in the activating solution consist of gold or palladium ions.

3. The process of claim 2 wherein the activating solution contains methanol.

4. The process of claim 1 wherein the solderable layer is a nickel layer applied by reduction of a nickel compound after subjecting the intercoat formed on the semiconductor to another activating treatment.

References Cited

UNITED STATES PATENTS

| | | | |
|---|---|---|---|
| 3,393,091 | 7/1968 | Hartmann et al. | 117—213 XR |
| 3,150,994 | 9/1964 | Hoke | 117—130 |
| 3,373,054 | 3/1968 | Lang et al. | 117—130 |
| 3,424,660 | 1/1969 | Klein et al. | 117—130 |

WILLIAM L. JARVIS, Primary Examiner

U.S. Cl. X.R.

117—130, 217, 227